US006940893B1

(12) United States Patent
Pinkney et al.

(10) Patent No.: US 6,940,893 B1
(45) Date of Patent: Sep. 6, 2005

(54) HIGH-SPEED INDOOR WIRELESS CHIRP SPREAD SPECTRUM DATA LINK

(75) Inventors: John A. Pinkney, Calgary (CA); Spence T. Nichols, Priddis (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/407,133

(22) Filed: Sep. 27, 1999

(51) Int. Cl.$^7$ .................................. H04B 1/69
(52) U.S. Cl. ............... 375/139; 375/130; 375/146; 375/152; 370/307; 370/441
(58) Field of Search .................... 375/130, 139, 375/152, 146, 296, 346, 348, 349, 240; 370/307, 370/441; 342/383; 708/813

(56) References Cited

U.S. PATENT DOCUMENTS

| | | | |
|---|---|---|---|
| 4,037,159 A | 7/1977 | Martin | 325/30 |
| 4,438,519 A | 3/1984 | Bose | 375/1 |
| 5,105,294 A | 4/1992 | Degura et al. | 359/154 |
| 5,748,670 A | 5/1998 | Zastrow | 375/204 |
| 5,768,317 A * | 6/1998 | Fague et al. | 375/296 |
| 6,049,563 A * | 4/2000 | Matsui | 375/139 |
| 6,252,882 B1 * | 6/2001 | Matsui | 370/441 |
| 6,291,924 B1 * | 9/2001 | Lau et al. | 310/313 |
| 6,404,338 B1 * | 6/2002 | Koslar | 340/571 |
| 6,453,200 B1 * | 9/2002 | Koslar | 607/60 |

OTHER PUBLICATIONS

Pnkney et al., A Robust High Speed Indoor Wireless Communications System using Chirp Spread Spectrum, 1999 IEEE Canadian Conferencevol. 1, pp. 367-370, Feb. 1999.*
Takeuchi et al., A Chirp spread spectrum DPSK modulator and demodulator for a time shift multiple acces communication system by using SAW devices, 1998 IEEE MTT-S International, vol. 2, pp. 507-510, Jun. 1998.*
Gugler et al., Simulation of a SAW-Based WLAN Using Chirp- pi/4 DQPSK Modulation, IEEE, Ultrasonic Symposium, vol. 1, pp. 381-384, Oct. 1998.*
Huemer et al., Design and Verification of a Saw based Chirp spread spectrum system, IEEE MTT-International, vol. 1, pp. 189-192, Jun. 1998.*
Brydon et al., Robust medium rate data transmission at HF, Radio Receivers and Associated Systems, International Conferenc on, Jul. 23-27, 1990.*

(Continued)

*Primary Examiner*—Shuwang Liu
(74) *Attorney, Agent, or Firm*—Christensen O'Connor Johnson Kindness PLLC (57) ABSTRACT

This invention modulates data onto a radio channel in such a way that the deleterious effects of the channel are reduced. This is accomplished in three steps: first, the information signal is modulated using a phase-differential modulation scheme. Second, the modulated signal is spread in both time and frequency by passing it through a dispersive filter, transmitting it through the channel, and removing the spreading using a dispersive filter in the receiver with the opposite characteristics of the filter in the transmitter. The third step, after demodulation, is to pass the signal through a low-pass filter to gather up the signal energy which has been dispersed by the channel. All three of these steps can be implemented with simple functional blocks, making this system very inexpensive to implement. Also included are two methods for enhancing the data throughput of the basic system, making it more bandwidth efficient.

10 Claims, 10 Drawing Sheets

OTHER PUBLICATIONS

H.F. data transmission using chirp signals, G.F. Gott, J.P. Newsom, Proc. IEE, vol. 118, No. 9, Sep. 1971, p. 1162-1166.

Surface Acoustic Wave Devices and Their Signal Processing Applications, C. Campbell, Academic Press, Boston, 1989, Chapter 9, The SAW Linear FM Chirp Filter, p. 193-205. p. 209-215.

High-speed DQPSK chirp spread spectrum system for indoor wireless applications, J. Pinkney, R. Behin, A Sesay and S. Nichols, Electronics Letters, Oct. 1, 1998, vol. 34, No. 20, p. 1910-11.

Digital Communications, J.G. Proakis, McGraw-Hill, Inc. New York, 1995, Chapter 5: Optimum Receivers For the Additive White Gaussian Noise Channel, p. 274-278.

Digital Communications, J.G. Proakis, McGraw-Hill, Inc. New York, 1995, Chapter 14: Digital Communications Through Fading Multipath Channels, p. 758-769.

Adaptive Filter Theory, S. Haykin, Prentice Hall, New Jersey, 1996, Chapter 9, Least-Mea-Square Algorithm, p. 365-377.

* cited by examiner

HIGH-SPEED INDOOR WIRELESS CHIRP SPREAD SPECTRUM DATA LINK

BACKGROUND OF THE INVENTION

The reliable transmission of high data rate information through the short hop radio channel (i.e. a wireless channel having receiver-transmitter distance of less than 1 km) remains a complex and elusive engineering problem. The physical nature of the indoor radio channel causes random distortive effects that can render a communications system inoperable. The prior art includes many elaborate schemes that mitigate these effects, however they are generally very complex and unsuitable for applications requiring mobility and/or portability.

Nature has already solved this problem, however, in the form of bats. Bats use echolocation for nighttime navigation and face many of the same distortion effects that radio systems do. Through the process of evolution they have developed powerful probing signals called chirps, which overcome many of these effects.

The distortive effects referred to previously arise largely from the multipath nature of the radio channel, that is, a signal may travel from transmitter to receiver via many different paths. This is in contrast to a wired channel (a telephone line, for instance) in which a signal can only travel along a single path. Multipath occurs because the physical space between the receiver and transmitter is occupied by objects which reflect the radio signal. The reflections create echoes which appear at the receiver as copies of the original transmitted signal. These echoes have independent (i.e. random) amplitudes and delay times with respect to each other. At the receiver they add together to create an unpredictable total signal; this signal may also change with time as objects in the physical environment move about.

When multipath echoes add together as they do in the receiver of a wireless communications system, two main distortive effects can result. First, the addition of the delayed echoes at the receiver stretches out or disperses the original transmitted signal. This dispersion makes the transmitted symbols longer, and if adjacent symbols are not spaced far enough apart in time they can collide and Intersymbol Interference (ISI) can occur. Second, the periodic nature of the transmitted RF carrier along with the random delays of each echo can cause them to add destructively. Under the right conditions, this destructive interference (called fading) between echoes can cause reductions in the received power by a factor of 1000 or more.

The main engineering problem arising from these two effects has to do with their relationship to the transmitted signal's bandwidth. If the transmitted signal has a narrow bandwidth, (i.e. does not cover a large range of transmitted frequencies) the receiver will experience flat fading and the entire signal can sit within a fade for a short period of time. Under these conditions the communication system will not function correctly. This condition can be mitigated by widening the occupied bandwidth of the signal (i.e. so it covers a large range of frequencies). The simplest way to increase the transmitted signal's bandwidth is to increase the transmitted symbol rate. Unfortunately, increasing the symbol rate also reduces the time between symbols increasing the probability that dispersion in the channel will cause adjacent symbols to collide and produce ISI. This presents the dilemma of wireless data transmission: in order to reduce the possibility of flat fading the symbol rate must be increased to the point where ISI can occur.

The art of indoor wireless communications includes techniques that can utilize large bandwidths with respect to their symbol rate; these are commonly referred to as spread spectrum systems. These techniques overcome the paradox between intersymbol interference and flat fading. The two most popular spread spectrum methods, Direct Sequence and Frequency Hopping, both increase the signal's bandwidth by dividing the symbol time into smaller pieces and performing specific operations on each piece. This operation increases the occupied bandwidth of the system by whatever factor the symbol time was divided, thus eliminating flat fading effects. The cost of using spread spectrum is increased system complexity required for encoding, synchronization and decoding of the aforementioned pieces, which must occur at a much higher speed than the symbol rate.

SUMMARY OF THE INVENTION

In this invention, we propose the use of chirp signals (similar to those used by bats) to spread the bandwidth of the original data signal. There is a major difference between this technique and the conventional spread spectrum techniques used in indoor wireless communications, however, in that chirps spread the transmitted signal in both time and frequency rather than frequency alone. This means that the spread signal may have a longer duration than the original data symbol, despite the fact that the symbol rate remains the same. The overlap between adjacent symbols which results from this spreading is not a problem—chirps have a property called "time shift orthogonality" which allows two similar chirp signals to overlap in time provided they possess a small mutual time shift. The lengthening of the spread signals reduces the speed at which any signal processing has to operate as a result of the spread spectrum process. This results in a much simpler hardware realization despite its large occupied bandwidth.

This technique (called Chirp Spread Spectrum) has been used in RADAR systems and outdoor wireless communications. The first communications applications of such systems were suggested by Gott and Newsome[3] in 1971 for use in low data rate high-frequency radio communications systems over long distances. However, to date these systems have had low symbol rates and are optimized for channels which have very different characteristics from the indoor wireless channel. In the indoor channel, high data throughput for such applications as Local Area Networks (LANs) is desired, which results in very different requirements from known applications.

It is an objective of this invention to provide a novel method of overcoming the debilatative effects of multipath propagation in the indoor radio channel. Another objective of this invention is to include an embodiment that can be realized with simple analog hardware—analog systems have an advantage because they can be implemented in ways that are compact and power efficient at the high frequencies. In an aspect of the invention, there is provided also three hardware elements which are required to meet the above listed objectives. A feature of this invention is that when all three elements are implemented as described herein, no digital signal processing or additional diversity (i.e. antenna or coding) is required for reliable operation in the indoor multipath channel.

As well as the above listed features, this invention provides in a further aspect for two methods which can further increase the data throughput of the system described above with a small amount of additional hardware. The first method achieves this by increasing the ensemble of chirp spreading signals which are used and detecting each at the receiver. The second method utilizes an equalizer and a second phase demodulator to reduce the effects of ISI and allow a higher symbol transmission rate. The invention without the methods for increasing the data throughput will henceforth be referred to as the "basic system".

In one embodiment, the invention operates as follows. A chirp signal is generated in which information is carried in the phase of the chirp signal. In a preferred embodiment, the information to be transmitted is first modulated using a known differential phase modulation scheme such as DPSK, DQPSK, D8PSK, etc. The process of modulation converts the data symbols to an RF carrier with some specific phase. It should be noted here that in the basic system the modulated symbol time must be longer than the delay spread of the channel to avoid intersymbol interference. This restricts the symbol time in the average indoor wireless channel to 100–500 ns, resulting in a symbol rate of from 2 to 10 MHz.

The phase modulated RF signal is then spread in both time and frequency using a dispersive filter. This filter can be any analog filter with appropriate delay characteristics but the preferred embodiment is a monolithic Surface Acoustic Wave (SAW) type filter due to its compactness. Along with the SAW filter a circuit for reduction of electromagnetic feedthrough (EMF) is included to increase the overall signal-to-noise ratio for the system. The output of the dispersive filter is the aforementioned chirp signal which may have time duration many times longer than the original data symbol. This chirp signal is then upconverted to the transmit frequency and sent over the channel.

Upon reception, the modulated chirp signal is downconverted from the transmit frequency to a frequency compatible with the receiver dispersive filter. In an aspect of the invention, after passing through a SAW filter whose dispersion characteristics are matched to the transmitter SAW, the original transmitted symbol will be spread into narrow pulses corresponding to each of the multipath "echoes" of the channel. These echoes will each have a unique phase and as such cannot be easily combined at this point. However, after differential phase demodulation they will have similar phase and may be added together, thus recombining the transmitted energy spread by the channel.

The addition of the multipath echoes in the receiver provides a simple yet effective form of diversity for the system. The structure used to add the echoes is known as a RAKE structure. The time diversity provided by the RAKE allows the system to function despite the changing nature of the channel.

In addition to the above, two methods may be included whereby the basic system can be enhanced to increase the data throughput. The first method utilizes an ensemble of chirp signals (in contrast to the single linear chirp used in the basic system) each of which is assigned a symbol value. Each of these chirp signals preferably has the same occupied bandwidth and processing gain. When a particular symbol value is to be transmitted, the chirp signal assigned that particular symbol value is used for spreading the differentially phase modulated information signal. The receiver will have the capacity to detect every one of the ensemble of chirp signals used in transmission; thus the chirp signal used by the transmitter will be detected and the symbol value assigned to it recovered. In this way extra data can be conveyed between the transmitter and receiver without affecting the characteristics of the original differentially phase modulated signal.

The second method utilizes an equalizer in the receiver to reduce the Intersymbol Interference (ISI) between successive symbols thus permitting symbols to be transmitted closer together in time. A slow demodulator (i.e. long symbol time) is used to train the equalizer and a fast demodulator (i.e. short symbol time) is used to transmit the information symbols. This method utilizes the inherent high channel resolution provided by the compressed chirp signals to train the equalizer. Once trained, the equalizer will reduce ISI between successive symbols permitting faster data rates.

The objects listed at the beginning of this summary and the system functioning will become more apparent upon consideration of the following detailed description, when read in conjunction with the attached drawings.

BRIEF DESCRIPTION OF THE DRAWINGS

There will now be described preferred embodiments of the invention, with reference to the drawings, by way of example and without intending to limit the generality of the claims, in which like reference characters denote like elements and in which:

DETAILED DESCRIPTION OF THE PREFERRED EMBODIMENTS

Figure 1:
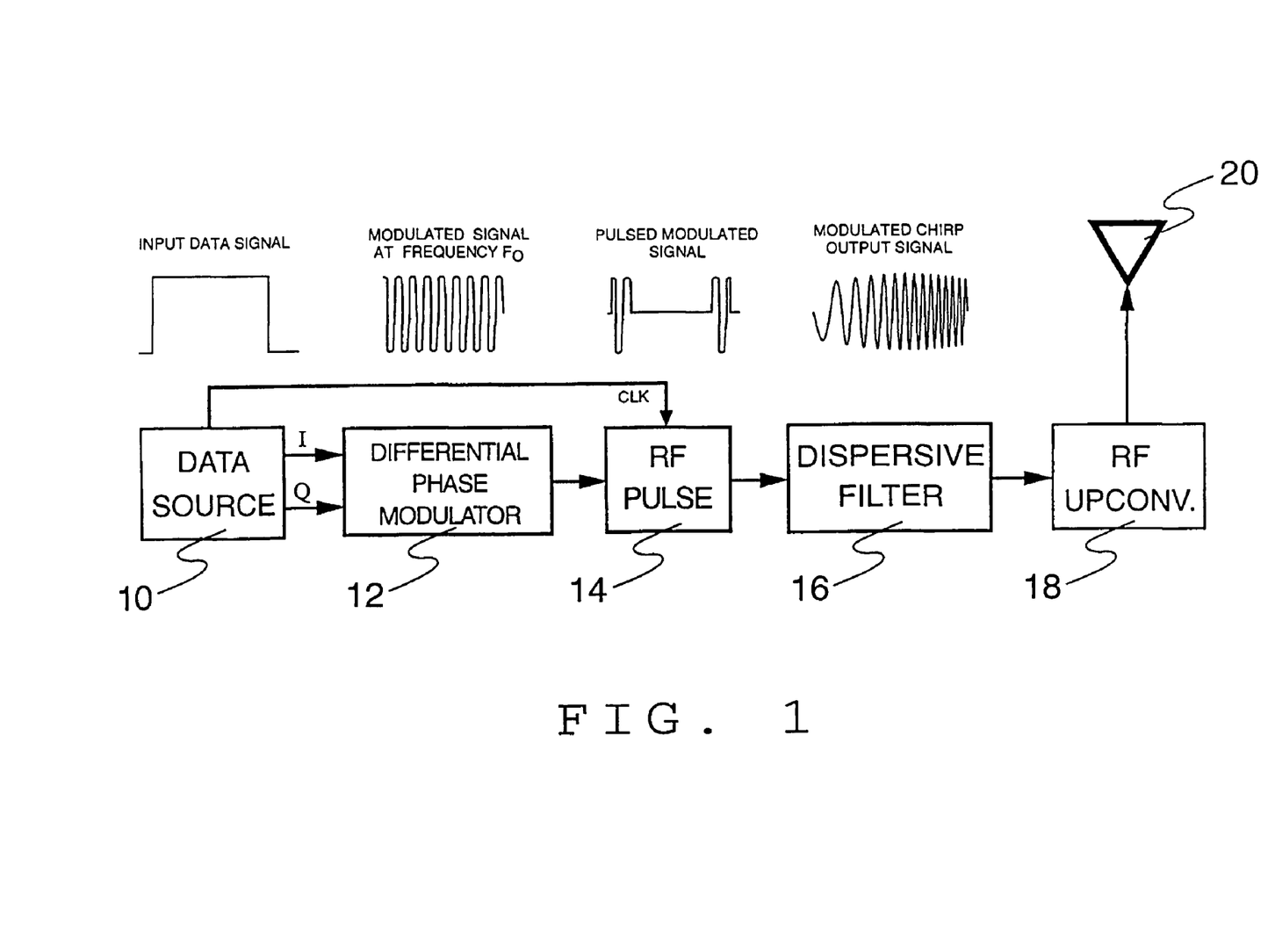
FIG. 1 is a schematic of the transmitter portion of the invention. Included are signals which would be seen at the various stages of the device.
Figure 2:
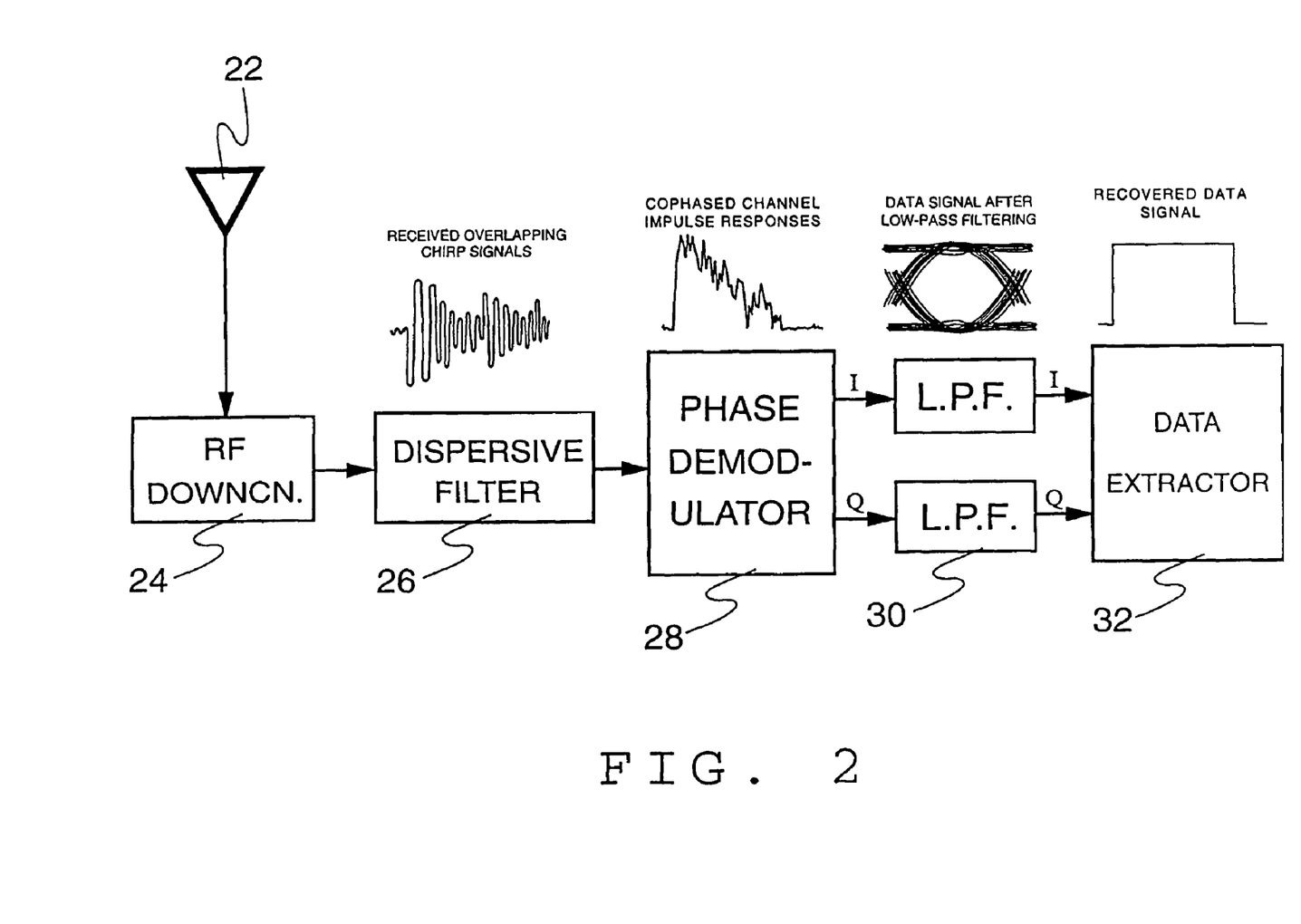
FIG. 2 is a block diagram of the receiver portion of the invention. Included are signals which would be seen at the various stages of the device.
Figure 6:
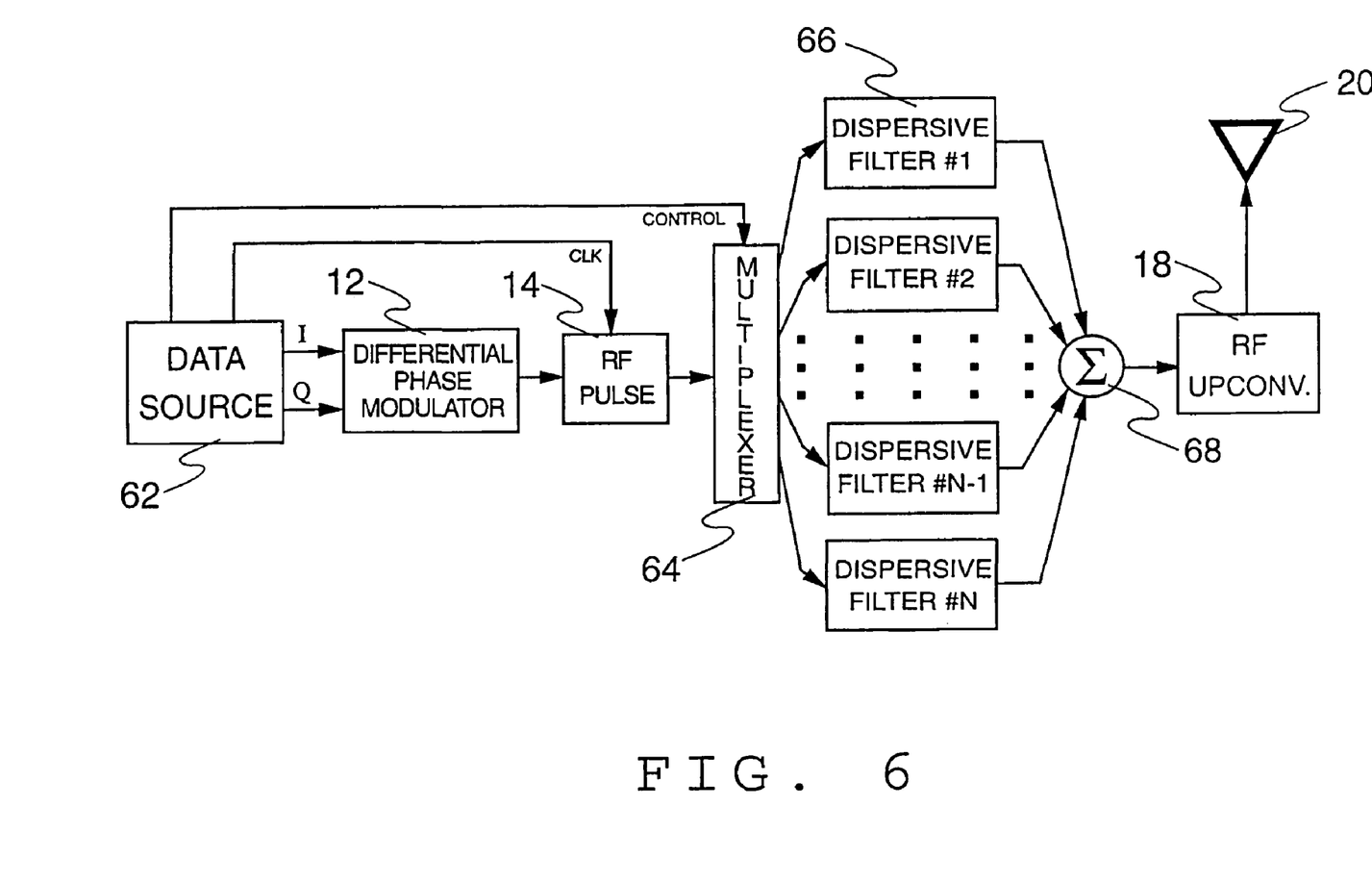
FIG. 6 is a schematic diagram of the transmitter portion of the device with the data throughput enhancement feature.
Figure 7:
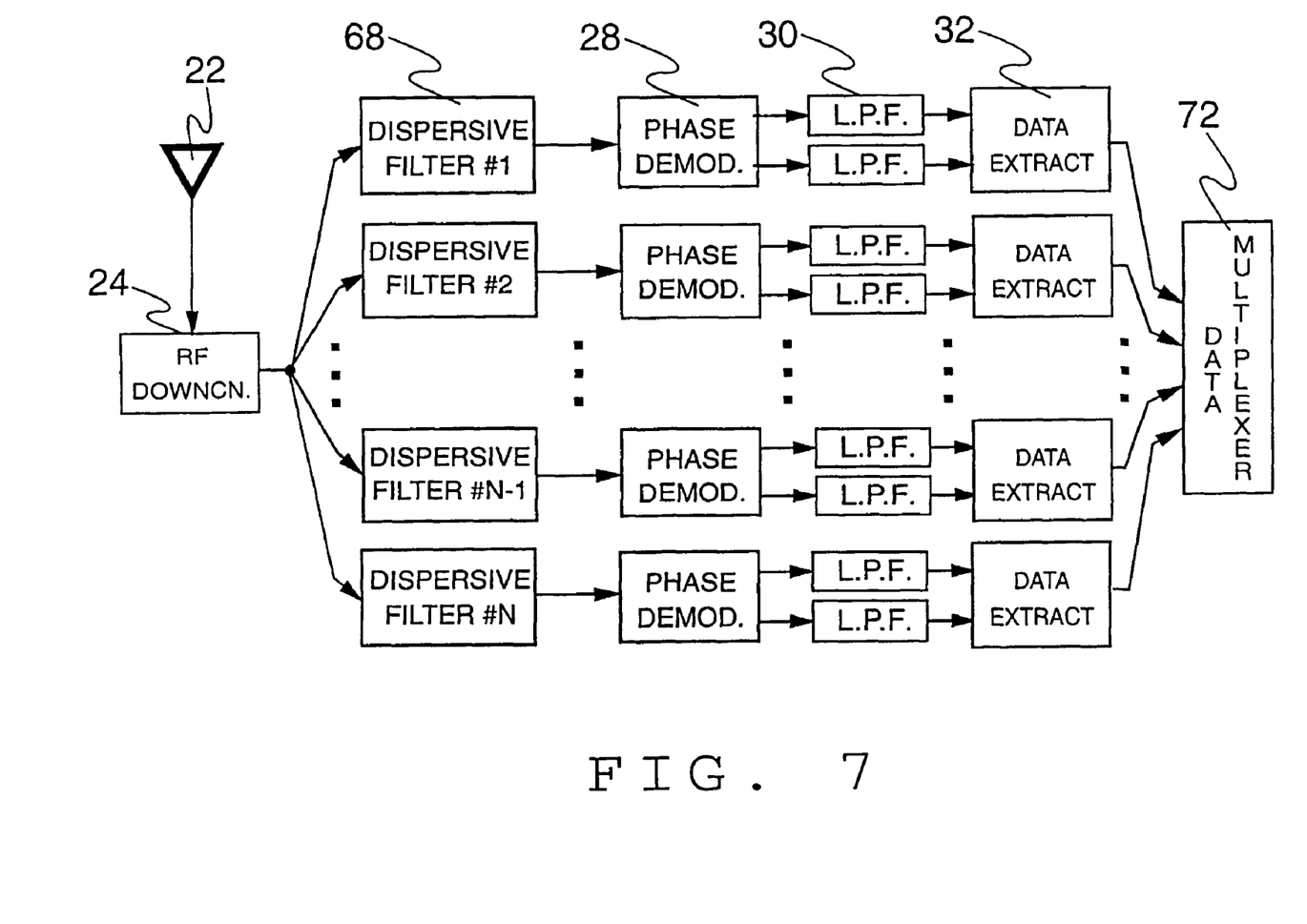
FIG. 7 is a schematic diagram of the receiver portion of the device with the first data throughput enhancement feature (nonlinear chirps).
Figure 9:
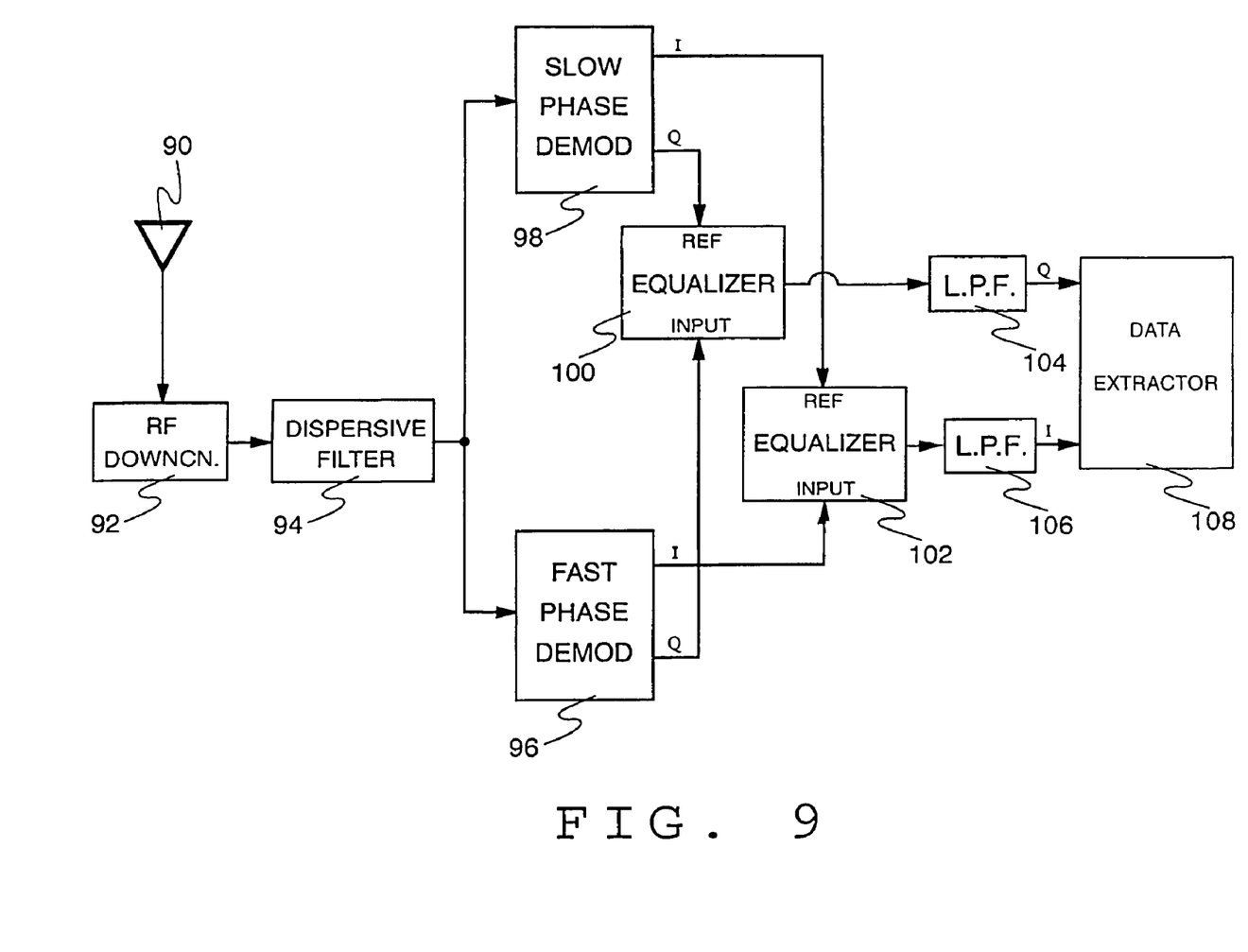
FIG. 9 shows a schematic diagram of the receiver portion of the device with the second data throughput enhancement feature (equalizer).

The basic apparatus which performs the operations described above consists of a transmitter (FIG. 1) and a receiver (FIG. 2). The transmitter's function is to modulate the data onto chirp signals and transmit these signals over the channel. The receiver's function is to recover the transmitted signal and reconstruct the original transmitted data. FIG. 6 and FIG. 7 show the transmitter and receiver schematics for the first enhanced version of the device, and FIG. 9 shows the receiver schematic for the second enhanced version of the device.

The schematic diagram of the basic transmitter is shown in FIG. 1. Also included in FIG. 1 are approximate plots of the signals at each stage of the device. Data from a data source 10 (which may be a computer or other digital information producing device) is fed into a differential phase modulator 12 which differentially encodes it onto a carrier. The encoding scheme should be a differential phase modulation scheme such as DPSK, DQPSK or one of higher order (see [4] for details). This carrier is then converted from a continuous wave to one which is pulsed in nature through RF pulse 14. Data source 10, differential phase modulator 12 and RF pulse 14 together comprise a chirp signal generator. The conversion process increases the bandwidth of the modulated wave. The switched pulse will have a period equal to the symbol time of the information signal and to provide sufficient bandwidth (wide enough to probe the SAW filter completely) the on-time of the switched pulse should be from 10–20 nS. The duty cycle of the pulsed signal is typically short, for example, about 8%. The carrier frequency of the modulated wave must be compatible with the centre frequency of the dispersive filter 16. The pulsed modulated signal is then passed through dispersive filter 16 which spreads the pulse out in time. The output of the dispersive filter 16 is the aforementioned chirp signal. The output of the dispersive filter 16 is then upconverted from the carrier frequency used in dispersive filter 16 to the desired transmit frequency and amplified through RF upconverter 18, after which antenna 20 transmits it over the wireless channel. RF upconverter 18 and antenna 20 together comprise an RF section.

The schematic diagram of the basic receiver is shown in FIG. 2. The transmitted signal is picked up by the receive antenna 22, amplified and downconverted by the RF downconverter 24 from the transmit frequency to a carrier frequency compatible with the dispersive filter 26. The output of the RF downconverter 24 is passed through receiver dispersive filter 26 which is similar in configuration to transmitter dispersive filter 16. The difference between dispersive filters 16 and 26 is that they have reciprocal group delay characteristics. The signal seen at the output of dispersive filter 26 is the resolved overlapping chirp signals corresponding to the multipath characteristics of the channel centered at the RF carrier frequency of the dispersive filter. The output of dispersive filter 26 is then demodulated using differential phase demodulator 28 to produce an Inphase (I) and a Quadrature (Q) component each consisting of cophased channel impulse responses with the phase information signal modulated on them. This baseband channel impulse response is then integrated through low-pass filters 30 and the resultant symbols are extracted and recovered using data extractor 32. Elements 28, 30 and 32 together comprise a data recovery section.

Figure 3:
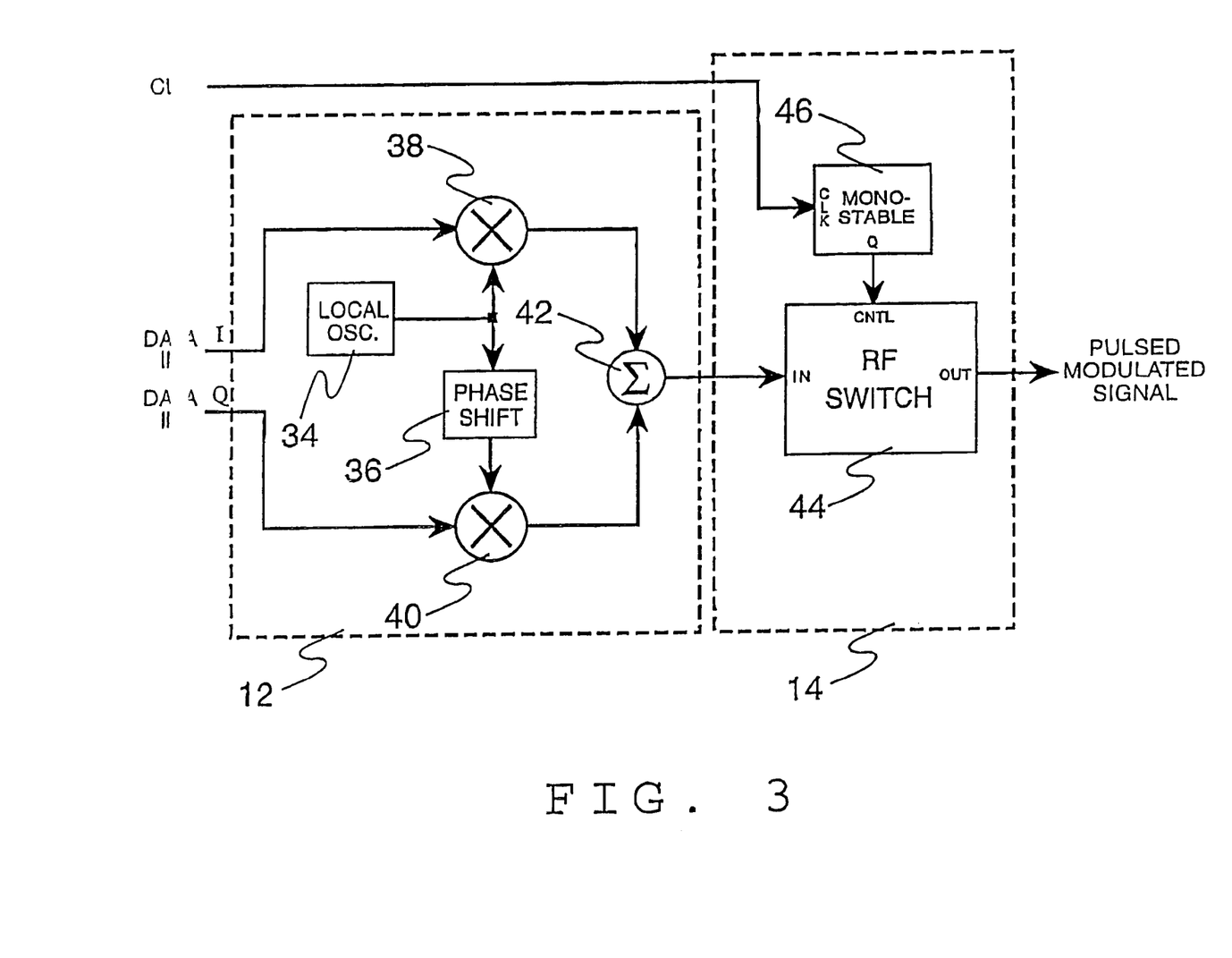
FIG. 3 is a schematic diagram of the I-Q modulator and RF switch used in the transmitter.

FIG. 3 shows a detailed schematic diagram of the phase modulator block 12 and the RF pulse circuitry 14. The data source 10 will produce differentially encoded Inphase (I) and Quadrature (Q) data components according to a differential quadrature phase modulation scheme [4]. The baseband differential phase modulator 12 converts the encoded data from the data source 10 into a differentially phase encoded RF carrier. An I-Q modulator consisting of double-balanced mixers 38 and 40 and 90° phase shifter 36 upconverts the baseband I-Q signal produced by the data source 10 to a carrier frequency compatible with the dispersive filter 16. A local oscillator 34 controls this centre frequency. After adding the I and Q components with summer 42, the signal at the appropriate carrier frequency is passed through a single pole single throw (SPST) RF switch 44.

The switching action for the RF switch 44 is controlled by a monostable multivibrator 46. The time constant of monostable 46 can be set to control the width of the RF pulse produced by RF switch 44. Typically, a switching time of from 10–20 ns is desired, thus a high speed logic family such as Emitter Coupled Logic (ECL) is the preferred embodiment for monostable 46. The clock line for monostable 46 (which triggers the start of the RF pulse) is supplied by the data source 10 and must be synchronized with the start of each data symbol. The output of RF switch 44 is fed into dispersive filter 15.

Figure 4:
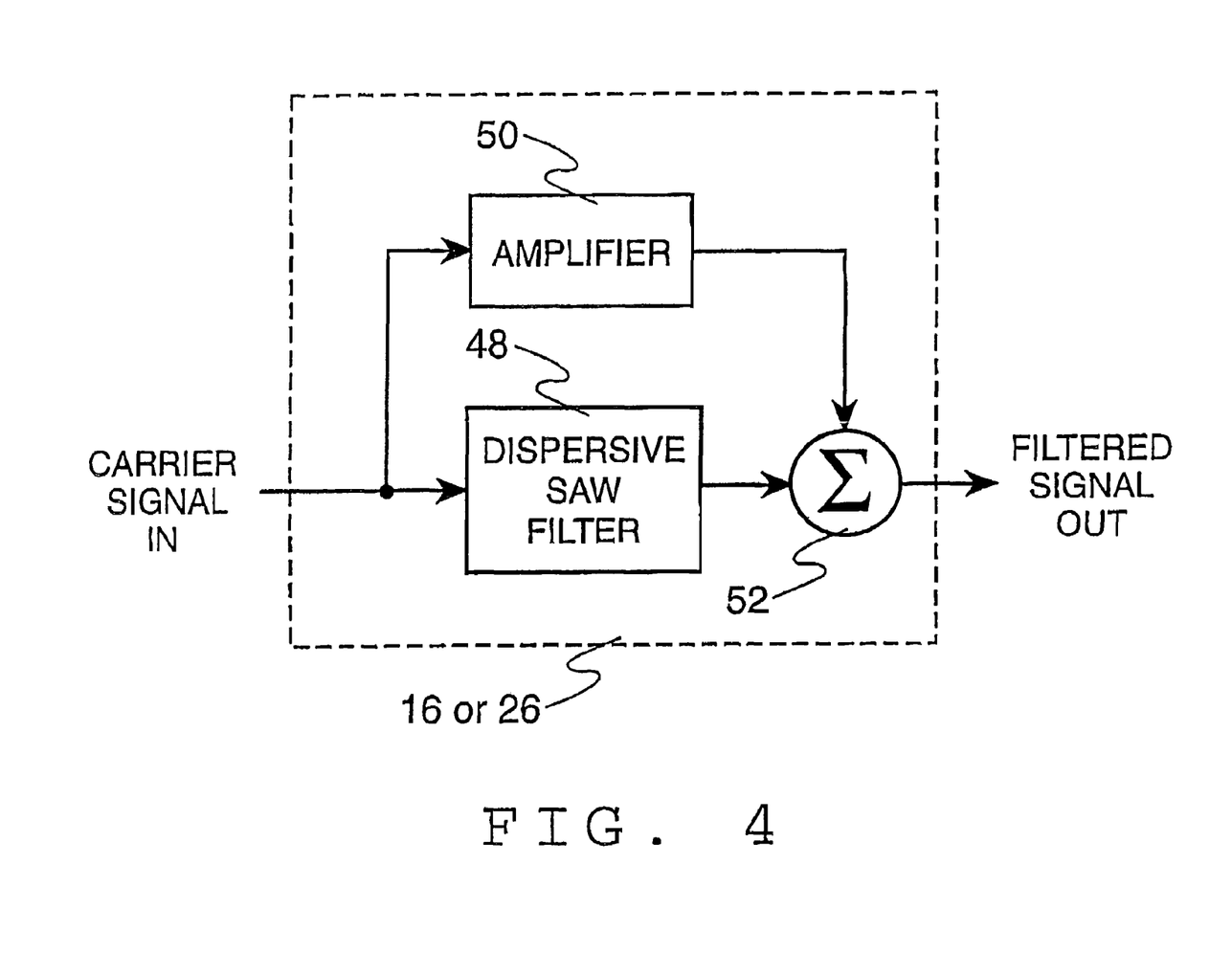
FIG. 4 is a schematic diagram of the dispersive filter block used in both the receiver and transmitter.

FIG. 4 shows a detailed schematic diagram of the dispersive filter block used in both transmitter dispersive filter 16 and receiver dispersive filter 26. Dispersive filter block 16 and 26 is fed with a carrier signal from the RF pulse 14 in the transmitter and RF downconverter 24 in the receiver. This signal is a modulated data signal at the appropriate carrier frequency for dispersive filter 16 and 26. A cancellation circuit is utilized to remove unwanted signals which result from electromagnetic feedthrough (EMF) between the input to the output of the SAW filter. The carrier input signal is split into two separate paths, one of which goes through dispersive SAW filter 48 and the other through amplifier 46. Amplifier 46 is chosen such that its gain exactly matches the gain of dispersive SAW filter 48 with a phase shift of 180° relative to dispersive SAW filter 48. The output of amplifier 46 and dispersive SAW filter 48 are then summed with summer 50 and the filtered signal output is fed to the RF upconverter 18 in the transmitter or phase demodulator 28 in the receiver.

This cancellation technique described above is well known in the art and is employed in this invention to eliminate unwanted spurious signals from feeding through dispersive SAW filter 48. Because the input signal to transmitter dispersive filter block 16 is pulsed, RF coupling between the input and output ports of the filter can cause the signal produced by the RF pulse 14 to jump across the terminals of dispersive SAW filter 48. In the receiver dispersive filter 26, the cancellation technique is used to further reduce unwanted signals; this increases the system's signal to noise ratio and reduces the errors during demodulation.

Figure 5:
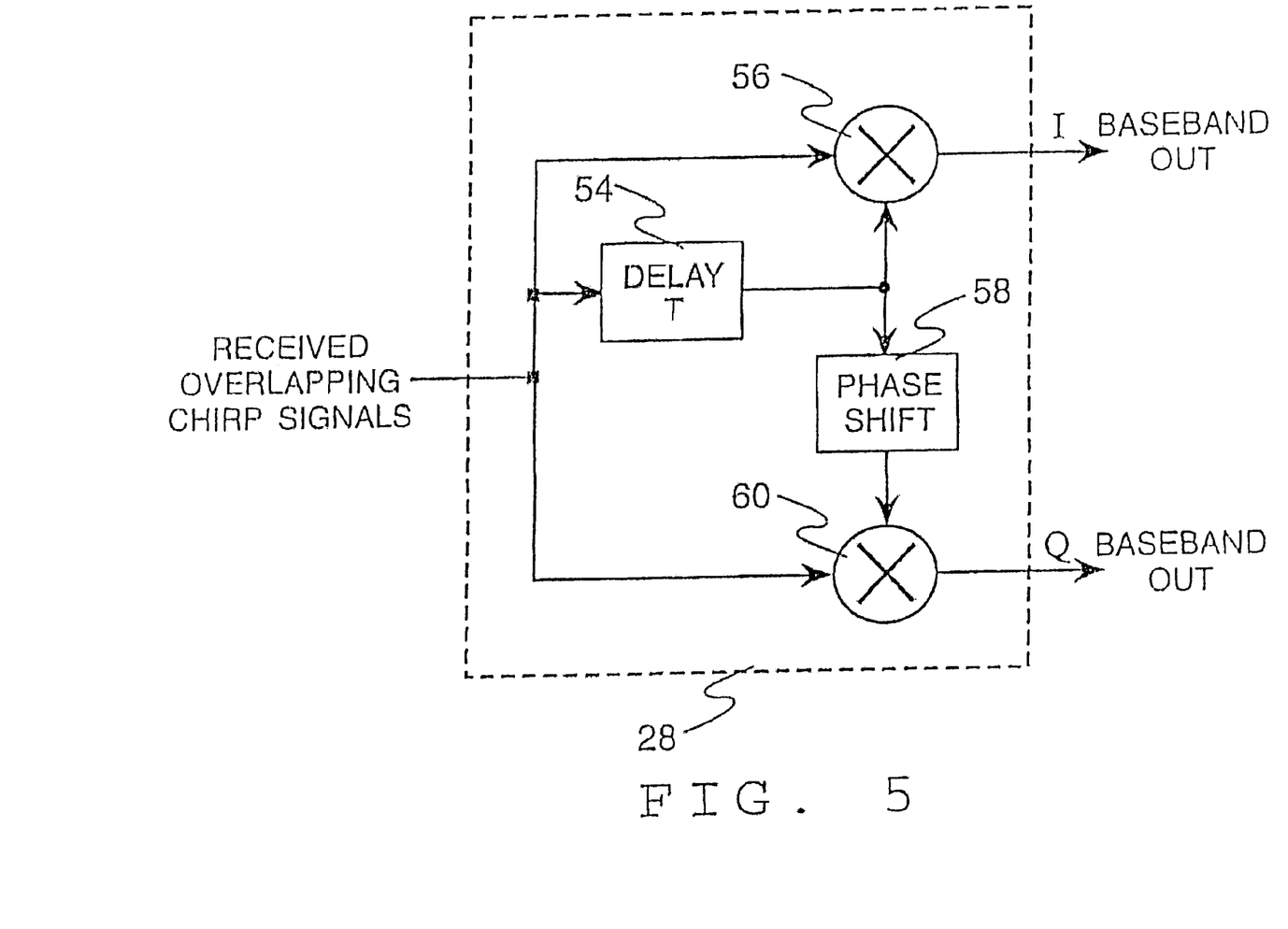
FIG. 5 is a schematic diagram of the analog differential phase demodulator used in the receiver.

FIG. 5 shows a schematic diagram of the receiver demodulator circuit. The signal from receiver dispersive filter 26 is split into two streams each of which feed into a double balanced mixer 56 and 60. This same signal is passed through delay 54 whose delay time is equal to the symbol time of incoming data. Thus the symbol time of the system must be known by the receiver a priori. The embodiment of delay 54 can be a delay line, a SAW filter or simply a cable with the appropriate propagation time. The signal from delay 54 is fed into double balanced mixer 56 and through 90° phase shifter 58. The output of the 90° phase shifter 58 feeds into the second double balanced mixer 60. As a result of the mutual phase shift between the two double balanced mixers 56 and 60 caused by 90° phase shifter 58, the output of double balanced mixer 56 will be the Inphase (I) component of the signal, and the output of double balanced mixer 60 will be the Quadrature (Q) component of the signal. Both of the I and Q components are fed through low-pass filters 30, which integrate the symbol energy and reproduces the transmitted data symbol. After low-pass filter 30 a data extractor 32 then extracts the data symbol by looking for the peak of the signal coming out of low-pass filter 30 and sampling the symbol at the appropriate point.

Low-pass filter 30 can have many different embodiments—digital filters as well as analog low-pass designs can be used, provided the cutoff frequency of the low-pass filter is equal to one over the symbol time of the data signal. If an analog filter is used for low-pass filter 30, reductions in hardware complexity can be achieved. The preferred embodiment for low-pass filter 30 is a 2-pole butter worth low-pass configuration.

FIG. 6 shows a schematic diagram of an embodiment of the transmitter which has been modified to increase data throughput of the system through the use of nonlinear chirps. Data source 62, differential modulator 12 and RF pulse 14 are identical to data source 10 differential phase modulator 12 and RF pulse 14 in the basic system, with the exception that additional data lines from data source 62 control multiplexer 64. The output signal from RF pulse 14 feeds into analog multiplexer 64 which is controlled by data source 62. The analog multiplexer 64 will switch the output of RF pulse 14 into one of N dispersive filters 66 of a dispersive filter bank, according to a control line produced by data source 62. Each of the filters in the dispersive filter bank 66 is designed to produce a different nonlinear chirp signal. Thus the analog multiplexer 64 will cause a different chirp signal to be transmitted according to the state of the control line from data source 62. The signals from each of dispersive filters of the dispersive filter bank 66 is added together with adder 68 and fed into RF upconverter 18 and antenna 20 before being transmitted over the channel.

FIG. 7 shows a schematic diagram of the receiver embodiment which has been modified to match the increased throughput transmitter of FIG. 6. As with the receiver in the basic system, antenna 22 captures the transmitted signal which is then amplified and downconverted to a useful carrier frequency by RF downconverter 24. At this point the signal is split into the same number of paths as are dispersive filters in dispersive filter bank 66 in the transmitter. Each path contains a dispersive filter 68, a phase demodulator 28 low-pass filters 30 and data extractor 32. The only difference between the various paths is that each dispersive filter 68 will be matched to a single dispersive filter in the transmitter dispersive filter bank 66. For example, dispersive filter #1 in the receiver 68 will be matched to dispersive filter #1 in the transmitter dispersive filter bank 66. After data extractor 32 provides the data output from each of the dispersive filters 68, a data multiplexer 72 determines which filter bank has the highest output signal level. In so doing, the receiver can determine the state of the data line feeding the multiplexer 72 in the transmitter, thereby increasing the number of bits per symbol of the system. After combining this data with the data obtained through phase demodulator 28, low-pass filter 30 and data extractor 32, the entire data symbol can be sent to whatever device needs to utilize the information.

Figure 8:
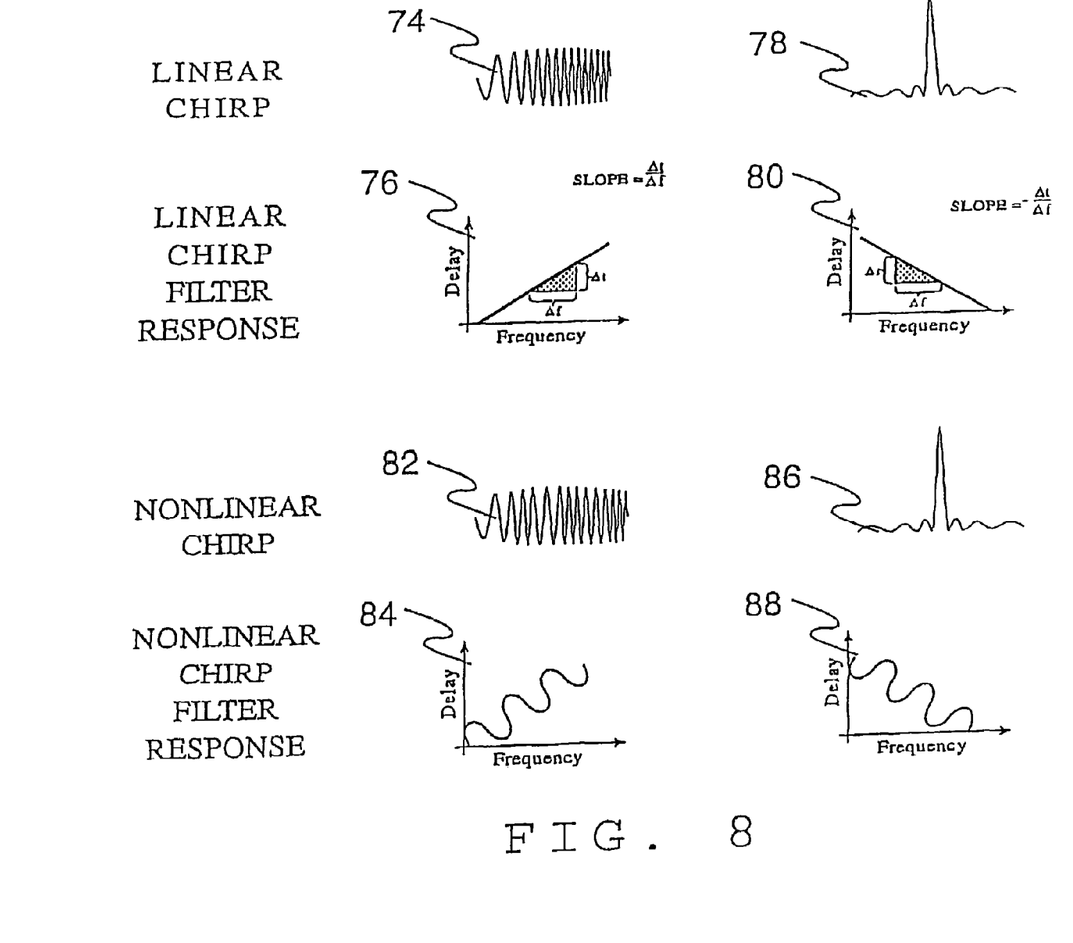
FIG. 8 shows one embodiment of the group delay characteristics for the transmitter and receiver dispersive filters for both linear and nonlinear chirp configurations. It also has examples of waveforms produced by those filters.

FIG. 8 shows an embodiment of the time-frequency characteristics of the transmitter dispersive filter 16 and the receiver dispersive filter 26 (the linear case), as well as an embodiment for the enhanced transmitter dispersive filter 68 and the enhanced receiver dispersive filter 68 (the nonlinear case). In the linear case, the transmitter filter delay characteristics 76 and the receiver filter group delay characteristics 80 must have opposite slopes so that their mutual group delay is constant. At the transmitter, linear chirp waveform 74 will be produced which is the desired signal to be transmitted over the channel. At the receiver this signal will be processed through receiver dispersive filter 26 to produce a narrow pulse, 78. It is this narrow pulse that allows the multipath of the channel to be resolved.

In the nonlinear case, a complex function 84 describes the group delay characteristics of both the transmitter dispersive filter 66 and the receiver dispersive filter 68. Many different embodiments of the transmitter delay 84 and the receiver delay 88 may be used, provided they are chosen such that their mutual delay is constant. As with linear chirp 76, a transmitter chirp waveform 82 will be produced which is the desired signal to be transmitted over the channel. At the receiver this signal will be processed through receiver dispersive filter 68 to produce a narrow pulse, 86.

In linear chirp case 76, rather than have transmitter dispersive filter 16 with a group delay which has the negative of the slope of the receiver dispersive filter 26, the receiver RF downconverter 24 can employ sideband inversion with respect to the transmitter (i.e. the local oscillator chosen such that is centre frequency is the RF carrier frequency plus IF frequency while the transmitters local oscillator is the RF frequency minus the IF frequency), this is a technique well known in the art. If sideband inversion is used in the receiver RF downconverter 24, then identical linear SAW filters can be used in both receiver and transmitter. This embodiment is preferred since it improves phase matching between the receiver and transmitter dispersive filters 16, 26. In the case of nonlinear chirps, sideband inversion cannot generally be used.

Since the multipath nature of the channel is resolved by receiver dispersive filter 26, it is the channel dispersion which determines the minimum time between symbols and the maximum symbol rate. Symbols must be transmitted at a rate no greater than the total delay spread of the channel to avoid intersymbol interference (ISI). Despite the fact that the symbol rate is essentially fixed for a given set of channel characteristics, the data throughput can be increased both by the use of the throughput enhanced embodiment (FIG. 6 and FIG. 7) and by increasing the constellation size of the differential modulation scheme. For instance, a system using DPSK can be increased to DQPSK, DQPSK can be raised to D8PSK, and so forth.

FIG. 9 shows the schematic diagram of the receiver embodiment which has been modified to increase data throughput of the system using an equalizer. As with the basic system embodiment, an antenna 90, an RF downconverter 92 and a dispersive filter 94 perform the receiver front-end signal capture and processing. Unlike the basic system, this embodiment has two phase demodulators; a slow phase demodulator 98 whose delay T 54 is large with respect to the channel excess delay, and a fast demodulator 96 whose delay is small with respect to the channel excess delay. The only difference between the two phase demodulators 98 and 96 is their delay. The slow phase demodulator 98 is used to obtain the channel multipath profile. The slow phase demodulator 98 provides the reference signal for I and Q equalizers 100 and 102. The fast phase demodulator provides the input signal for I and Q equalizers 100 and 102.

Equalizers 100 and 102 are designed to suppress or remove intersymbol interference (ISI), many different equalizer topologies are possible. Using equalizers to remove ISI in this way is a technique well known in the art, and thus the details of equalizers 100 and 102 are not discussed herein. For more detailed information [5] can be consulted.

After equalization and ISI removal, the I and Q signals are filtered through lowpass filters 106 and 104 respectively. The outputs of low-pass filters 106 and 104 are then fed into a data extractor 108, wherein the information bits are extracted as with the basic system.

Figure 10:
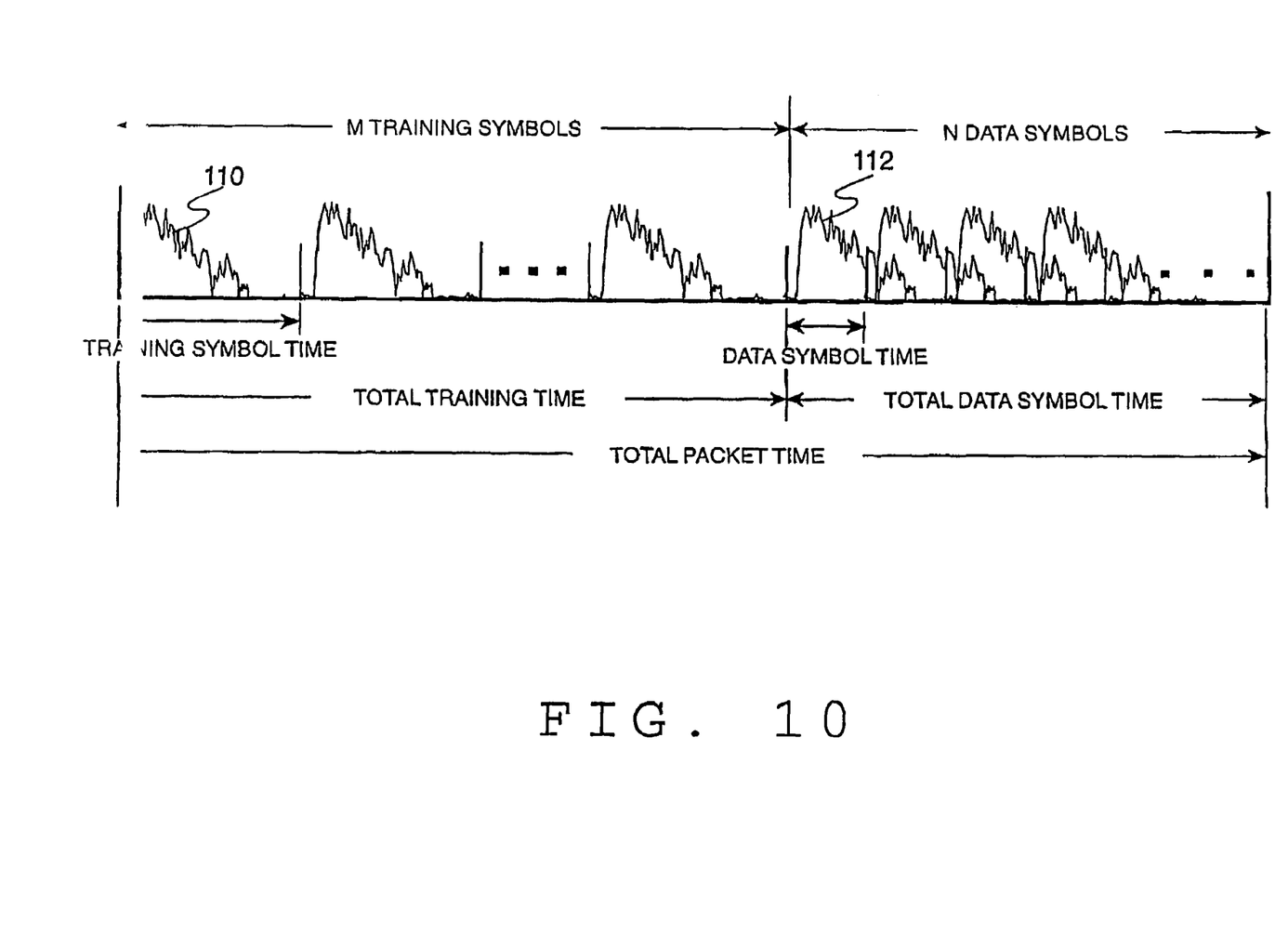
FIG. 10 shows the transmitted symbol sequence which is required by the second data throughput enhancement feature.

FIG. 10 demonstrates the preferred embodiment of the transmit data format which can be used to ensure proper equalizer functionality. In this embodiment, some number of training symbols M are transmitted at the beginning of each data block. The received version of these symbols 110 will consist of a known data sequence, ("1"s, for instance) convolved with the channel impulse response. The time between these symbols 110 will be chosen such that they are farther apart than any anticipated excess delay introduced by the channel (i.e. there is no possibility of ISI during the training symbols). During this so-called "training sequence" equalizers 106 and 104 utilize the outputs of the slow phase demodulator 98 for training the equalizers 106 and 104. The number of training symbols M transmitted depends on the characteristics of the particular equalizer used for the implementation of 106 and 104.

After training, information symbols 112 are transmitted with an intersymbol time which is much shorter that the channel excess delay. These symbols will typically overlap and suffer ISI until passed through equalizers 100 and 102. After equalization, ISI caused by channel spreading will be reduced and the bit error rate of the received data will be improved. In this way the time between symbols can be made shorter than without the equalization and the information throughput rate of the system can be increased.

REFERENCES

[1] Campbell, C.: 'Surface Acoustic Wave Devices and Their Signal Processing Applications', (Academic Press, Boston, 1989).
[2] Pinkney, J., Behin, R., Sesay, S., and Nichols, S.: 'A High-Speed DQPSK Chirp Spread Spectrum System for Indoor Wireless Applications', Electronics Letters, October 1998, 34, (20), pp. 1910–1911
[3] Gott, G. F and Newsome, J. P.: 'H. F. Data Transmission Using Chirp Signals', *Proc. IEE*, September 1971, 118, (9), pp. 1162–1166.
[4] Proakis, J. G.: 'Digital Communications', (McGraw-Hill, New York, 1995).
[5] Haykin, S.: 'Adaptive Filter Theory', (Prentice Hall, New Jersey, 1996).

Immaterial modifications may be made to the invention described here without departing from the essence of the invention.

The embodiments of the invention in which an exclusive property or priviliege is claimed are defined as follows:

1. A method of communicating over a wireless indoor telecommunications channel, the method comprising the steps of:
   generating a pulsed signal in which information is carried in the phase of the pulsed signal;
   spreading the pulsed signal using a dispersive filter to form a chirp spread spectrum signal;
   transmitting the chirp spread spectrum signal over a wireless indoor telecommunications channel;
   receiving the chirp spread spectrum signal at a receiver;
   despreading the chirp spread spectrum signal using an inverse dispersive filter that is matched to the dispersive filter to yield a received signal;
   removing the phase of the received signal, using a phase demodulator, thereby generating cophased channel impulse responses;
   passing the cophased channel impulse responses through a low-pass filter to generate data symbols; and
   recovering the information carried in the phase of the pulsed signal from the generated data symbols.

2. The method of claim 1 in which generating a pulsed signal comprises:
   modulating a data signal onto a carrier using a phase differential modulator; and
   converting the modulated carrier into the pulsed signal.

3. The method of claim 1 in which the chirp signal is generated using plural dispersive filters, each assigned to a particular symbol value, and the chirp spread spectrum signal is despread using plural inverse dispersive filters matched to corresponding ones of the plural dispersive filters.

4. The method of claim 1 in which the dispersive filter is a SAW filter.

5. The method of claim 1 in which recovering the information carried in the phase of the pulsed signal comprises applying an equalizer to the cophased channel impulse responses to reduce intersymbol interference caused by a channel multipath.

6. The method of claim 5 in which applying the equalizer to the pulsed signal comprises training the equalizer with a slow phase demodulator and applying the equalizer to the cophased channel impulse responses after demodulation with a fast phase demodulator.

7. A transmitter for communicating over a wireless indoor communications channel, the transmitter comprising:
   a pulsed signal generator incorporating a modulator;
   a dispersive filter bank comprising plural filters, the dispersive filter bank being connected to receive a pulsed modulated signal from the pulsed signal generator, where an excitation of each of the plural filters corresponds to a different transmitted symbol value, the output of the dispersive filter bank being a chirp spread spectrum signal; and
   an RF section for upconverting the chirp spread spectrum signal for transmission.

8. The transmitter of claim 7 in which the pulsed signal generator comprises:
   a data source;
   a differential phase modulator connected to receive data from the data source; and
   an RF pulse generator connected to receive a modulated signal from the differential phase modulator.

9. A receiver for communicating over a wireless indoor communications channel with a transmitter defined by claim 7, the receiver comprising:
   an RF receiving section configured to produce a received chirp spread spectrum signal as output;
   an inverse dispersive filter bank matched to the dispersive filter bank in the transmitter and connected to receive the chirp spread spectrum signal from the RF receiving section and generate a received pulsed signal;
   a phase demodulator bank connected to the inverse dispersive filter bank, the phase demodulator bank generating cophased channel impulse responses from the received pulsed signal;
   a low-pass filter bank on the output of the phase demodulator bank for generating data symbols from the cophased channel impulse responses; and
   a data extractor bank connected to the low pass filter bank, the data extractor bank recovering originally transmitted information from the data symbols and having data as output.

10. The transmitter of claim 7 in which the excitation of each of the plural filters is controlled by a signal from a data source.

* * * * *